June 1, 1948. J. R. FREI 2,442,489
MEANS FOR VENTING ENCLOSED SPACES
Filed Oct. 30, 1943

INVENTOR.
Jakob R. Frei
BY
F. Bascom Smith
ATTORNEY

Patented June 1, 1948

2,442,489

UNITED STATES PATENT OFFICE 2,442,489

MEANS FOR VENTING ENCLOSED SPACES

Jakob R. Frei, Sidney, N. Y., assignor to Bendix Aviation Corporation, South Bend, Ind., a corporation of Delaware Application October 30, 1943, Serial No. 508,421

13 Claims. (Cl. 286—8)

1

This invention relates to machine elements and more particularly to apparatus wherein a rotatable member passes through the wall of a sealed oil containing space.

This application is a continuation in part of my copending application Serial No. 433,175, filed March 3, 1942, for "Magneto" and the subject matter thereof which is applicable to the disclosure of the present application is incorporated herein by reference.

One of the objects of the present invention is to provide novel means for equalizing the pressures within and without a chamber in which rotating elements operate.

Another object of the invention is to provide novel means for venting a chamber containing a quantity of lubricating oil for rotating parts therein.

A further object is to provide novel venting means of the above character which is substantially unaffected by the position of the apparatus in space and, hence, is applicable to apparatus on aircraft.

Still another object is to provide novel means whereby the effectiveness and efficiency of oil sealing means or the like around rotating parts extending through the walls of lubricating oil compartments are materially enhanced.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

Figure 1:
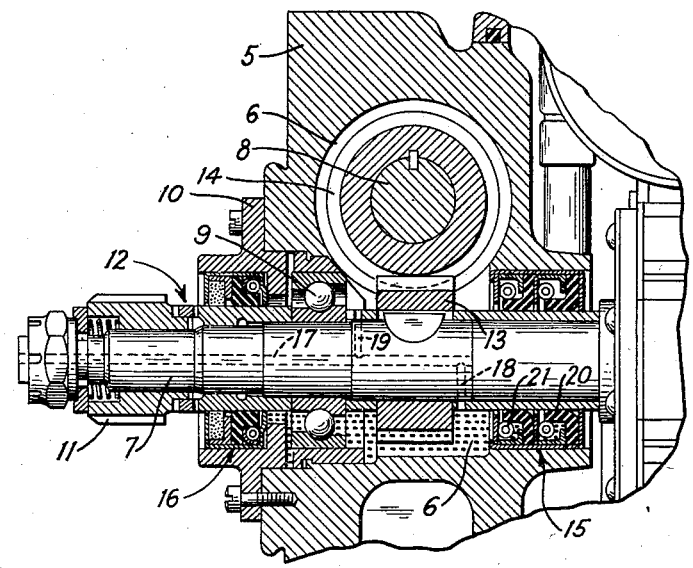
Figure 2:
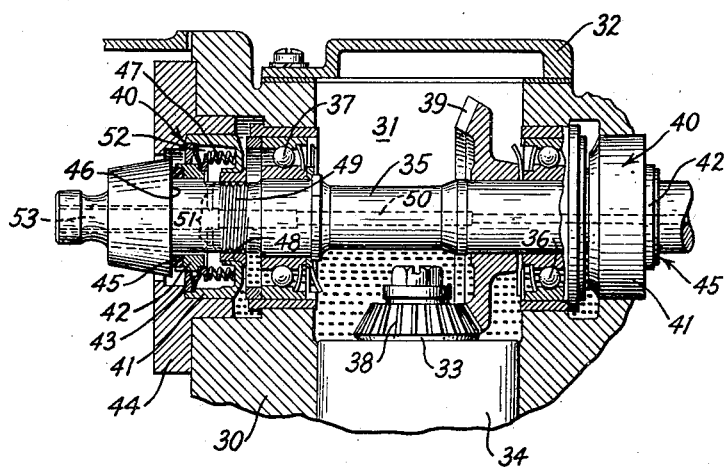

In the drawings, wherein like reference characters refer to like parts throughout the several views, Fig. 1 is a sectional view, with parts broken away, showing a portion of an apparatus, such as a magneto, embodying one form of the present invention; and Fig. 2 is a similar view showing a modified form of the invention in a similar apparatus.

Only two embodiments of the invention are illustrated by way of example in the accompanying drawings, the same being shown as incorporated in magneto-generators for use in the ignition system of an internal combustion engine. In the embodiment of Fig. 1, a casing 5 is formed with a space or chamber 6 through or into which extend two rotating shafts 7 and 8. Shaft 7 may be the rotor shaft of a magneto and is supported in casing 5 by an anti-friction bearing 9 and a similar bearing (not shown) adjacent the other end of the shaft in a manner illustrated in the parent application referred to above.

The outer end of shaft 7 extends through a plate 10 which is suitably secured over an opening in casing 5 and suitable means including toothed member 11 are provided on said end for operatively connecting the rotor shaft to an engine driving member (not shown) within the casing of an engine. Member 11 is preferably adjustably connected to shaft 7, such as by an adjustable coupling means 12 of the type disclosed in Spengler U. S. Patent No. 2,266,283.

Shaft 8 extends transversely through the upper portion of chamber 6 at right angles to shaft 7 and may be journalled in suitable anti-friction bearings or the like mounted in the wall of casing 5 where the shaft passes into or out of said chamber. Shafts 7 and 8 are drivably connected to one another by suitable drive means comprising a pair of intermeshing helical gears 13 and 14 keyed or otherwise secured to shafts 7 and 8, respectively. It is to be understood that shaft 8, which is shown mounted above the normally horizontal shaft 7 to extend on both sides of the latter could be formed in two sections for rotation about an axis which intersects the axis of the rotor shaft, said sections being disposed on opposite sides of the rotor shaft and being connected therewith by bevel gears or other suitable means.

In order that gears 13 and 14, bearing 9 and similar bearings for shaft 8 may be properly lubricated and for the purpose of preventing leakage and loss of lubricating oil from chamber 6, the latter is made substantially oil-tight by surrounding the shafts with suitable oil seals. A well-known type of oil seal 15 is mounted in casing 5 in oil sealing relation with a spacer sleeve surrounding shaft 7 where the latter passes through the wall of chamber 6. A similar oil seal 16 is provided in plate 10 around a sleeve rotatable with shaft 7. Similar or other suitable types of oil seals may be provided around shaft 8 where the same passes through the walls of chamber 6. The particular seals illustrated are known commercially as "Chicago Rawhide seals" and embody annular flexible elements 20 held in yieldable sealing engagement with the rotating parts by suitable resilient means 21.

Chamber 6 is normally filled with liquid lubricating oil to a level below the axis of rotation of shaft 7 when the latter is horizontal, and novel means are provided for preventing the building up of gaseous pressures within chamber 6 in excess of the surrounding atmospheric pressure. As shown, said means comprise an axial passage 17 extending substantially centrally through a portion of shaft 7 and communicating at its open end with the atmosphere outside of the lubricating oil chamber 6. For connecting passage 17 with the interior of chamber 6 there are provided a pair of radially extending passages 18 and 19, which are preferably axially spaced and extend in diametrically opposite directions from passage 17 to the periphery of shaft 7.

Accordingly, when shaft 14 is not rotating, one of the passages 18, 19 has the outer end thereof immersed in the lubricating oil while the other has the outer end thereof in communication with the air space in chamber 6 above the surface of said oil and therefore connects said space to the atmosphere on the exterior of the housing. The pressure within chamber 6 is thus maintained equal to the atmospheric pressure surrounding the casing. When shaft 7 is rotated, oil is prevented from escaping through passages 18 and 19 into passage 17 because of the effect of centrifugal action on any oil which tends to flow toward the center of shaft 7 through said radial passages 18 and 19. Accordingly, during operation of the device, the venting passages are maintained open for permitting equalization of the pressure within and without chamber 6, thereby preventing the building up of a pressure differential which might force the oil past the oil seals surrounding shafts 7 and 8. If desired, the venting passages 17, 18, 19 may be incorporated in shaft 8 so that a greater quantity of oil may be retained in chamber 6 when the apparatus is to be maintained in the position illustrated in the drawings. If any oil should leak out through passage 17, it would flow into the casing of the engine on which the apparatus is mounted.

In the embodiment of Fig. 2, a casing 30 is provided with a chamber or space 31 for lubricating oil or the like, one side of which is closed by a cover plate 32. A shaft 33, which may be the rotor shaft of a magneto, extends into the opposite side of chamber 31 and is surrounded by a suitable anti-friction bearing and oil seal which are shown diagrammatically at 34, said bearing and seal being similar to bearing 37 and seal 40, hereinafter described. A second shaft 35 extends in a normally horizontal position through chamber 31 and is supported by roller bearings 36, 37. Mounted on the upper end of shaft 33 is a bevel gear 38 which meshes with a similar gear 39 mounted intermediate the ends of shaft 35 for rotation therewith in chamber 31.

To prevent the escape from chamber 31 of liquid lubricating oil along shaft 35, which oil is necessary for the lubrication of gears 38, 39 and the bearings for shafts 33, 35, oil seals 40, 40 are provided outside the bearings 36, 37 and a similar bearing for shaft 33. Each of these seals, only one of which is shown in detail, comprises two relatively movable fabricated sections 41 and 42 which are connected to one another by a flexible annular diaphragm 43. Section 41 of the seal is press fitted into a plate 44 secured to casing 30, while section or assembly 42 is movable axially of shaft 35 and has a sealing ring 45 of carbon or like material mounted thereon. Said ring engages a radially extending shoulder 46 on shaft 35 and is held in yielding engagement therewith by a series of springs 47 or other suitable resilient means interposed between sections or assemblies 41 and 42.

Section 41 of each of the oil seals 40 preferably includes a sleeve 48 that surrounds and has a running clearance with a portion of shaft 35 on which a spiral groove 49 is cut. Said groove is so cut that upon rotation of shaft 35 in its normal direction of rotation, the groove tends to drive any oil which creeps along the shaft back toward the lubricating oil chamber 31.

Novel means are provided for venting chamber 31 to thereby avoid any substantial differential of pressures on opposite sides of the sealing rings 45. Shaft 35 is provided with a central passage 50 and a pair of diametrically disposed radial passages 51 which communicate with lubricating oil chamber 31 inside one of the oil seals 40, that is, with the annular space 52 within section 41 of the seal between ring 45 and helical groove 49. This space is relatively small and oil is prevented by the structure above described from readily flowing to it from the main portion of chamber 31. Under the most adverse conditions, therefore, only a small amount of oil, if any, will escape from the lubricating oil chamber through the vent passages 50, 51.

Just as in the embodiment of Fig. 1, passage 50 is connected to atmosphere at one end thereof and since one of the radial passages 51 always has sufficient communication with the unfilled portion of chamber 31 to permit the flow of air therebetween, there will be a substantial equalization of the pressures inside and outside of chamber 31 so that there will be no tendency of the oil to be driven out of said chamber by pressure within the same. Chamber 31 is preferably not filled with oil to a higher level than the axis of rotation of shaft 35 when the apparatus is in the position illustrated. Vent passage 50 may be closed at one end of shaft 35 by a plug 53 and is preferably larger in diameter adjacent the end where radial passages 51, 51 are provided. Thus, if any oil should enter passage 50, such as when shaft 35 is not in a horizontal position, such oil will most likely be driven back into space 52 and, hence, chamber 31 by centrifugal force during rotation of shaft 35.

There is thus provided a novel structure whereby a lubricating oil chamber or the like into which rotating parts extend may be vented to atmosphere without the addition of otherwise unnecessary parts and without subjecting the chamber to the danger of material oil leakage. The novel structure provided effects an equalization of pressures on opposite sides of an oil seal and thus eliminates a difficulty which has heretofore rendered such seals ineffective in some installations. The novel venting means thus comprehended is simple and effective and adds very little to the cost and time of production.

Although only a limited number of embodiments or modifications of the invention are illustrated and described, it is to be expressly understood that the same is not limited thereto. For example, various other types of oil seals, bearings, etc., may be used in lieu of those illustrated. Other changes may also be made in the design and arrangement of parts illustrated without departing from the spirit and scope of the invention, as will now be understood by those skilled in the art. For a definition of the limits of the invention, reference is had primarily to the appended claims.

What is claimed is:

1. In apparatus of the class described, a casing having a lubricant-containing compartment therein, at least two shafts extending into said compartment, means for drivably connecting said shafts in said compartment, means surrounding said shafts where the same pass through the walls of said compartment for sealing the latter against leakage of lubricant, and means for ventilating said compartment comprising an axially extending passage in one of said shafts having communication with the atmosphere outside of said compartment and at least two oppositely extending radial passages connecting said axially extending passage with the interior of said compartment.

2. In apparatus of the class described, a casing having a lubricant-containing compartment therein, a shaft extending into said compartment, and means surrounding said shaft where the same passes through the wall of said compartment for sealing the latter against leakage of lubricant, said shaft having two oppositely directed radially extending passages within the compartment communicating with the atmosphere outside said compartment by a passage in said shaft extending axially thereof.

3. In apparatus of the class described, a casing having a lubricant compartment, a rotatable shaft extending into said compartment, sealing means surrounding said shaft for retaining a lubricant in said compartment, and means for venting said compartment including an axially extending passage in said shaft having communication with the atmosphere outside said compartment and a radially extending passage in said shaft connecting said first-named passage and said compartment.

4. In apparatus of the class described, a casing having a compartment therein, a rotatable member extending into said compartment, sealing means surrounding said member for retaining a liquid in said compartment, and means for venting said compartment to atmosphere including an axially extending passage in said member having communication with the atmosphere outside said compartment and two radially extending passages in said member connecting said first-named passage and said compartment at opposite sides of said member.

5. In apparatus of the class described, a casing having a substantially air-tight compartment, a rotatable element extending into said compartment, sealing means surrounding said element where the latter passes through the wall of said compartment, and means for venting said compartment including an axially extending passage in said element and two diametrically disposed passages in said element connecting said first-named passage to said compartment.

6. In apparatus of the class described, a casing having a lubricating-containing compartment, a rotatable shaft extending into said compartment, sealing means surrounding said shaft for retaining a lubricant in said compartment, and means for venting said compartment including an axially extending passage in said shaft having communication with the atmosphere outside said compartment and a radially extending passage in said shaft connecting said first-named passage and said compartment, said axially extending passage increasing in diameter from end to end and the portion thereof having the largest diameter being adjacent said radially extending passage.

7. In apparatus of the class described, a casing having a sealed compartment therein, a rotatable member extending into said compartment, sealing means surrounding said member for retaining a liquid lubricant in said compartment, means forming a chamber around said member within said compartment, means including a spiral groove on said member tending to prevent the passage of a lubricant from said compartment into said chamber during rotation of said member while permitting the passage of air between said compartment and chamber, and means for venting said compartment including an axially extending passage in said member having communication with the atmosphere outside said compartment and at least one radially extending passage in said member connecting said first-named passage to said chamber.

8. In apparatus of the class described, a casing having a sealed compartment therein, a rotatable member extending into said compartment, sealing means surrounding said member for retaining a liquid lubricant in said compartment, means forming a chamber around said member within said compartment, means including a spiral groove on said member tending to prevent the passage of a lubricant from said compartment into said chamber while permitting the passage of air between said compartment and chamber, and means for venting said compartment including an axially extending passage in said member having communication with the atmosphere outside said compartment and at least one radially extending passage in said member connecting said first-named passage to said chamber, said axially extending passage being divided into portions of different diameters and the portion thereof having the largest diameter being adjacent said radially extending passage.

9. In apparatus of the class described, a casing having a lubricant-containing compartment, a rotatable shaft extending into said compartment, sealing means surrounding said shaft for retaining a lubricant in said compartment, said sealing means forming an annular chamber around said shaft within said compartment, means including a spiral groove on said shaft adapted to drive a liquid lubricant from said chamber into said compartment, and means for venting said compartment comprising an axially extending passage in said shaft and at least one radially extending passage in said shaft connecting said first-named passage with said chamber.

10. In apparatus of the class described, a casing having a lubricant-containing compartment, a rotatable shaft extending into said compartment, said shaft having a spiral groove in the surface thereof within said compartment, sealing means surrounding said shaft for retaining a lubricant in said compartment, means in said compartment forming an annular chamber around said shaft between said groove and said sealing means, the grooved portion of said shaft having a running clearance in said last-named means, and means for venting said compartment including an axially extending passage in said shaft and at least one radially extending passage connecting said first-named passage to said chamber.

11. In apparatus of the class described, a casing having a compartment therein, a rotatable member extending into said compartment, means in said compartment forming an annular chamber around said member, means tending to prevent the flow of liquid from said compartment into said chamber along said member, and means for venting said compartment including an axially extending passage in said member communicating with the atmosphere and a radially extending passage in said member connecting said first-named passage and said chamber.

12. In apparatus of the class described, a casing having a compartment therein, a rotatable shaft extending into said compartment, means surrounding said shaft for retaining a liquid in said compartment and forming an annular chamber around said shaft within said compartment, said chamber and compartment having communication for the passage of air through the clearance space between said shaft and means and said shaft having a spiral groove thereon between said compartment and chamber, and means for venting said compartment to atmosphere including an axially extending passage in said shaft and at least one radially extending passage in said shaft connecting said first-named passage to said chamber.

13. In apparatus of the class described, a casing having a sealed lubricant-containing compartment, rotatable means extending into said compartment, and means for venting said compartment comprising an axially extending passage in said rotatable means having communication with the atmosphere outside said compartment and at least one radially extending passage in said rotatable means connecting said first-named passage to said compartment, said axially extending passage varying in diameter from end to end and the portion thereof having the largest diameter being adjacent said radially extending passage.

JAKOB R. FREI.

REFERENCES CITED

The following references are of record in the file of this patent:

UNITED STATES PATENTS

| Number | Name | Date |
|---|---|---|
| 1,355,652 | Coppus et al. | Oct. 12, 1920 |
| 1,821,895 | Owens | Sept. 1, 1931 |
| 1,835,877 | Joyce | Dec. 8, 1931 |
| 1,886,714 | Moss | Nov. 8, 1932 |
| 2,038,299 | Kohlhagen | Apr. 21, 1936 |
| 2,193,903 | Hait | Mar. 19, 1940 |
| 2,198,782 | May | Apr. 30, 1940 |
| 2,223,748 | Thoren | Dec. 3, 1940 |